United States Patent
Kim et al.

(10) Patent No.: US 6,301,526 B1
(45) Date of Patent: Oct. 9, 2001

(54) MASTER DEVICE HAVING FORCE REFLECTION FUNCTION

(75) Inventors: Mun Sang Kim; Soo Yong Lee; chong won Lee, all of Seoul (KR)

(73) Assignee: Institute of Science and Technology, Seoul (KR)

( * ) Notice: Subject to any disclaimer, the term of this patent is extended or adjusted under 35 U.S.C. 154(b) by 0 days.

(21) Appl. No.: 09/478,359

(22) Filed: Jan. 6, 2000

(30) Foreign Application Priority Data

Dec. 3, 1999 (KR) .................................................. 99-8190

(51) Int. Cl.[7] ............................ G05B 15/00; G05B 19/00
(52) U.S. Cl. .................... 700/260; 700/245; 700/248; 700/257; 700/262; 700/263; 700/264; 901/3; 901/27; 901/28; 901/30; 901/34; 901/36; 74/490.01; 74/490.02; 74/490.03; 74/490.05; 74/490.06; 600/1; 600/109; 600/118; 600/559; 606/130
(58) Field of Search ..................................... 700/245, 260, 700/248, 257, 262, 263, 264; 600/1, 109, 118, 595; 606/130; 901/3, 27, 28, 30, 34, 36, 54; 414/4, 5, 7, 730; 74/490.1, 490.02, 490.03, 490.04, 490.05, 490.06

(56) References Cited

U.S. PATENT DOCUMENTS

| 4,575,297 | * | 3/1986 | Richter | 414/5 |
|---|---|---|---|---|
| 5,737,505 | * | 4/1998 | Shaw et al. | 345/419 |
| 5,845,540 | * | 12/1998 | Rosheim | 74/490.05 |
| 5,858,291 | * | 1/1999 | Li et al. | 264/105 |
| 5,945,978 | * | 8/1999 | Holmes | 345/157 |
| 6,016,385 | * | 1/2000 | Yee et al. | 700/245 |
| 6,223,100 | * | 3/2001 | Green | 700/264 |
| 6,233,504 | * | 5/2001 | Das et al. | 700/260 |

FOREIGN PATENT DOCUMENTS

408257948-A * 10/1986 (JP) .

OTHER PUBLICATIONS

Noakes, Teleoperator servoloop tuning using an expert system, 1990, IEEE, pp. 60–64.*

Lee et al., Sensors and actuators of wearable haptic master device for the disabled, 2000, IEEE, pp. 371–376.*

* cited by examiner

Primary Examiner—William A. Cuchlinski, Jr.
Assistant Examiner—McDieunel Marc
(74) Attorney, Agent, or Firm—Bacon & Thomas

(57) ABSTRACT

A master device for generating motion instruction of the slave robot by sensing motion of the arm with fixed to the arm of the operator, and reflecting motion limit information by external force and physical articulation limit sensed by the robot may be simplified in a serial chain configuration so to solve problems of human fatigue and operational complexity in order to minimize dead weight of units mounted to the arm by concentrating and positioning the cylindrical rotating shaft members (44 and 45) near the body.

11 Claims, 6 Drawing Sheets

MASTER DEVICE HAVING FORCE REFLECTION FUNCTION

BACKGROUND OF THE INVENTION

1. Technical Field

The present invention relates to a master device having a force reflecting function mounted to a human arm, and more particularly to a master device having reflecting function for solving problems of human fatigue, caused from dead weight, and operational complexity by simplifying a master device into a serial chain configuration and concentrating a torque generating unit near the body, in which the master device generates operation instruction of a slave robot by sensing motion of an arm of an operator and reflects operation limit information, caused from external force sensed by the slave robot and physical limitation of articulation with use of, such as, brake motor or servo motor.

2. Description of the Prior Art

Robots are generally used in various industries, but in an early stage the robot are adapted in difficult and dangerous tasks such as die casting, forging, and spot welding.

With development of the industrial robot, a multipurpose remote-controlled robot having a high degree of freedom is required and developed to operate various works instead of human.

A remote controller is required to manipulate various operations of the robot, and the remote controller is now developed to have various shapes and functions.

Therefore, such robot remote controlling device enables an operator to manage motion of the robot personally in order to accomplish any required works in a special circumference such as a faraway or dangerous works.

In order to control an industrial or anthropomorphic robot operator efficiently, used is a master adjusting device having a similar shape to a slave robot to be controlled or an anthropomorphic master control device which can be directly attached to an arm of human as a controller.

The anthropomorphic master control device has an advantage of inputting natural motion of human into the master device so that many variations are studied and developed.

However, most of such anthropomorphic master devices exert significant load on the operator with absolute weight of its electrical motor and weight of a supporter for mounting the device onto an arm of human, which causes it impossible to operate for long time and makes it difficult to control with dead weight and inertia.

Therefore, there is a need to develop a master device which can be mounted to an arm of human and also reduce its weight.

SUMMARY OF THE INVENTION

The present invention is designed to solve the above problems. Therefore, an object of the present invention is to provide a master device having a force reflecting function mounted to an operator arm for solving problems of human fatigue, caused from dead weight, and operational complexity by simplifying a master device into a serial chain configuration and concentrating a torque generating unit near the body.

In order to accomplish the object, the present invention provides a master device having force reflecting function attached to a body of an operator for controlling robot remotely, comprising:

first combining means fixed to an upper portion of a back of the operator;

second and third combining means connected and fixed to upper and lower portions of an elbow of the operator;

fourth combining means connected and fixed to a back of a hand of the operator;

first rotating shaft means fixed to the first combining means, the first rotating shaft means having a plurality of cylindrical rotating shaft members;

first connecting means of which one end is joined to the first rotating shaft means and the other end is serially connected through a plurality of rotating link members to a plurality of connecting members joined to the second combining means;

third rotating shaft means having a plurality of cylindrical rotating shaft members joined to the second combining means through connecting members;

second rotating shaft means having cylindrical rotating shaft members, the second rotating shaft means joined between the second combining means and the third combining means through connecting members; and second connecting means of which one end is joined to the fourth combining means and the other end is serially connected through a plurality of rotating link members to a plurality of connecting members joined to the third rotating shaft means, wherein the first rotating shaft means senses motion of a shoulder of the operator, the second rotating shaft means senses motion of the elbow of the operator, and the third rotating shaft means senses motion of a wrist of the operator.

BRIEF DESCRIPTION OF THE DRAWINGS

These and other features, aspects, and advantages of the present invention will become better understood with regard to the following description, appended claims, and accompanying drawings, in which like components are referred to by like reference numerals. In the drawings:

DETAILED DESCRIPTION OF THE PREFERRED EMBODIMENT

Hereinafter, configuration and operation of each preferred embodiment of the present invention will be described in detail with reference to the accompanying drawings.

Figure 1:
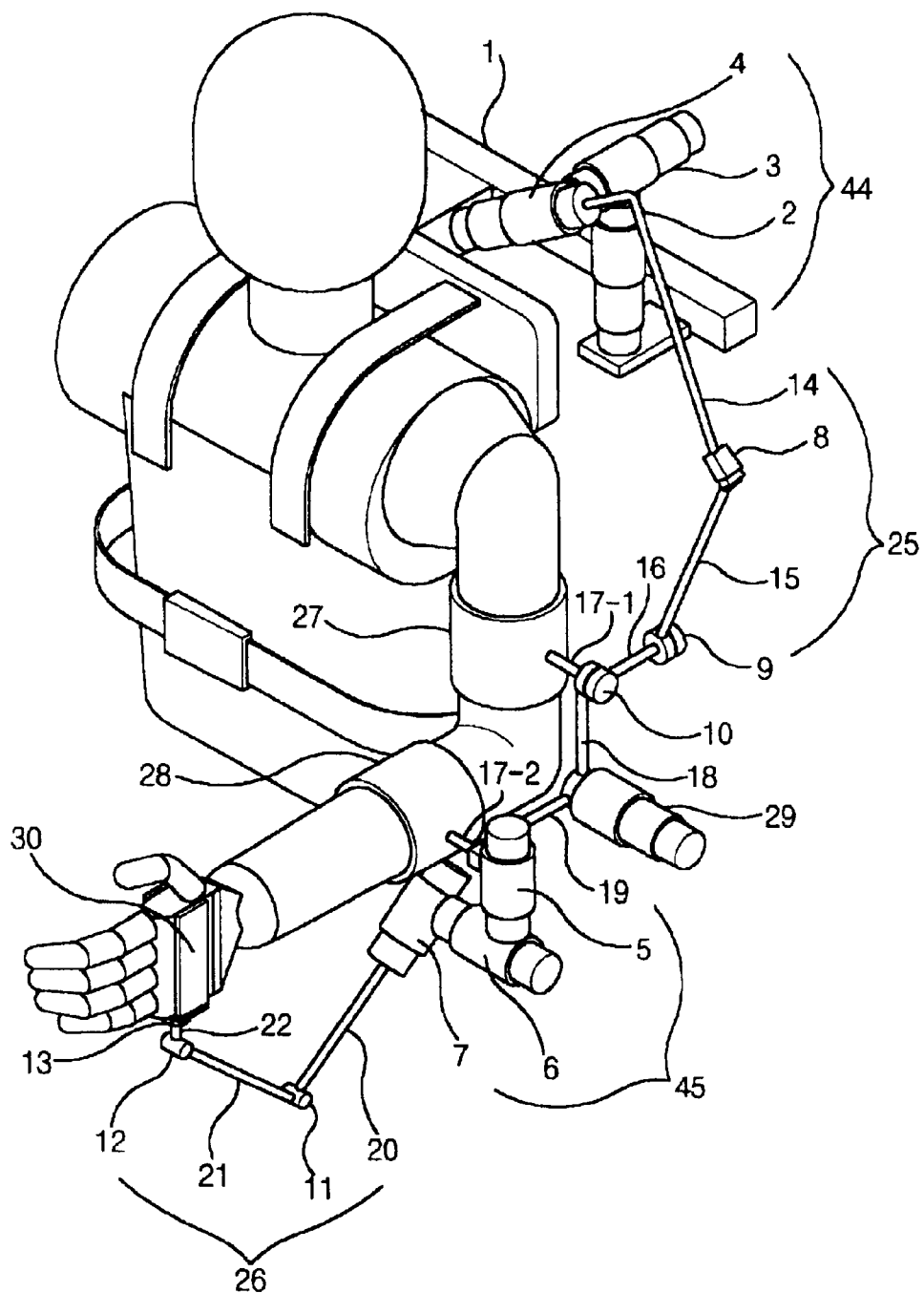
FIG. 1 is a schematic perspective view showing a master device having a force reflecting function mounted to a human arm according to the present invention.

As shown in FIG. 1, a master device having force reflecting function attached to a body of an operator for controlling robot remotely according to the present invention includes a first combining unit fixed to an upper portion of a back of the operator, second and third combining units connected and fixed to upper and lower portions of an elbow of the operator, a fourth combining unit connected and fixed to a back of a hand of the operator, a first rotating shaft unit fixed to the first combining unit, the first rotating shaft unit having a plurality of cylindrical rotating shaft members, a first connecting unit of which one end is joined to the first rotating shaft unit and the other end is serially connected through a plurality of rotating link members to a plurality of connecting members joined to the second combining unit, a third rotating shaft unit having a plurality of cylindrical rotating shaft members joined to the second combining unit through connecting members, a second rotating shaft unit having cylindrical rotating shaft members, the second rotating shaft unit joined between the second combining unit and the third combining unit through connecting members, and a second connecting unit of which one end is joined to the fourth combining unit and the other end is serially connected through a plurality of rotating link members to a plurality of connecting members joined to the third rotating shaft unit.

Each of the second, third and fourth combining units, the rotating link members, and the connecting members connecting the third rotating shaft unit has a predetermined length such that the rotating link members and the third rotating shaft unit can he positioned close to the body of the operator.

The first rotating shaft unit includes first, second and third rotating shaft members in three directions such that a position of an arm of the operator can be determined according to motion of an articulation of the shoulder of the operator.

The third rotating shaft unit includes fourth, fifth and sixth rotating shaft members in three directions such that a position of a hand of the operator can be determined by angle of rotation of the rotating shaft members according to motion of the wrist of the operator.

A plurality of the rotating link members for connecting the first connecting unit are first, second and third rotating link members, and the first connecting unit further comprises a first connecting member of which one end is joined to the first rotating shaft unit and the other end is joined to the first rotating link member, a second connecting member for connecting the first rotating link member and the second rotating link member, and a third connecting member joined to the second combining unit through a connecting member for connecting the third rotating link member and the second rotating link member.

A plurality of the rotating link members for connecting the second connecting unit are fourth, fifth and sixth rotating link members, and the second connecting unit comprises a fourth connecting member of which one end is joined to the third rotating shaft unit and the other end is joined to the fourth rotating link member, a fifth connecting member for connecting the fourth rotating link member and the fifth rotating link member, and a sixth connecting member joined to a lower portion of the fourth combining unit for connecting the sixth rotating link member and the fifth rotating link member.

The first rotating link member and the fourth rotating link member further comprise an initial Calibration position determining unit in order to compensate position thereof according to an arm length and a hand size of the operator.

Each of the cylindrical rotating shaft members includes a direction determining unit connected to each connecting member for measuring a motional direction of the arm, a gear unit for controlling torque, a torque generating unit having an electrical brake motor or servo motor, and a position determining unit for measuring motion of the arm with use of angle of rotation.

The direction determining unit comprises a first circular disk having elongated thorough holes in upper and lower portions connected to a support core and a thorough hole in a center portion, a second circular disk having a plurality of protrusions interposed into the elongated thorough holes and the thorough hole, a torsion spring positioned between the first circular disk and the second circular disk for connecting the two disks with preload, and a limit switch for sensing relative dimension of rotating load of each connecting member and the preload of the torsion spring.

The first and second connecting units include two parallel tubes, in which sixth and seventh connecting members are connected to each tube respectively so to be replaced with a driven body moving linearly, vertically.

Operation of the present invention constructed as above is as follows.

The present invention adopts serial chain mechanism in order to solve problems of human fatigue, caused by dead weight of the conventional device, and operational complexity by attaching a remote robot controller to an arm of an operator. In addition, in the present invention. the cylindrical rotating shaft units 44, 45 for controlling torque are concentrated in a region, preferably near the trunk in order to minimize dead weight of units attached to the arm.

For such reasons, the first cylindrical rotating shaft member is fixed to one side of the first combining unit 1 mounted on an upper portion of the back of the operator. Furthermore, the present invention includes the first, second and third cylindrical rotating shaft members 2, 3, 4 having three directional motion of roll, pitch and yaw such that directions thereof can be determined according to motion of an articulation of the shoulder of the operator.

Figure 2:
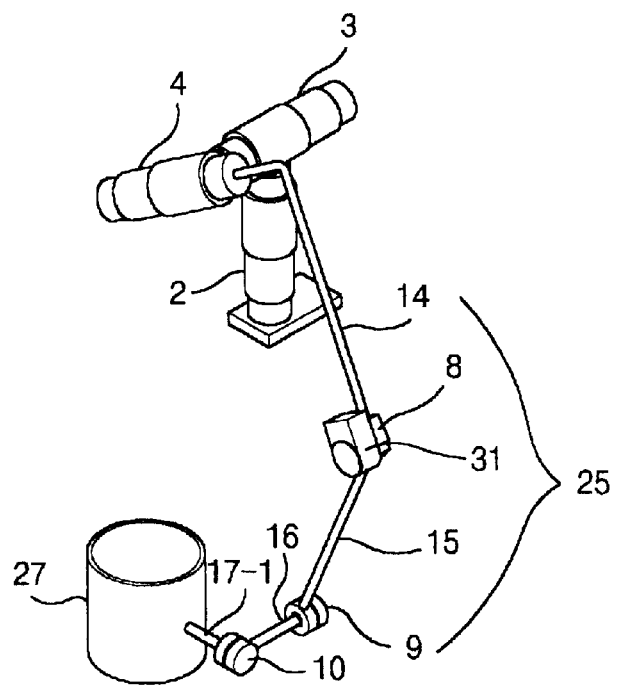
FIG. 2 is a perspective view showing configuration of a shoulder portion of the master device having a force reflecting function mounted to a human arm according to the present invention.

In addition, as shown in FIG. 2, positions of the first, second and third cylindrical rotating shaft members 2, 3, 4 are determined by motion of the first connecting unit 25.

The first connecting unit 25 includes a first rotating link member 8 provided between a shaft of the third cylindrical rotating shaft member 4 and the second combining unit 27 combined to an upper portion of the elbow, and first and second connecting members 14, 15 connected to the first rotating link member 8 in different directions to be rotated therewith.

Besides, the initial Calibration position determining unit 31 for measuring angle of rotation is combined to the first rotating link member 8.

Figure 8:
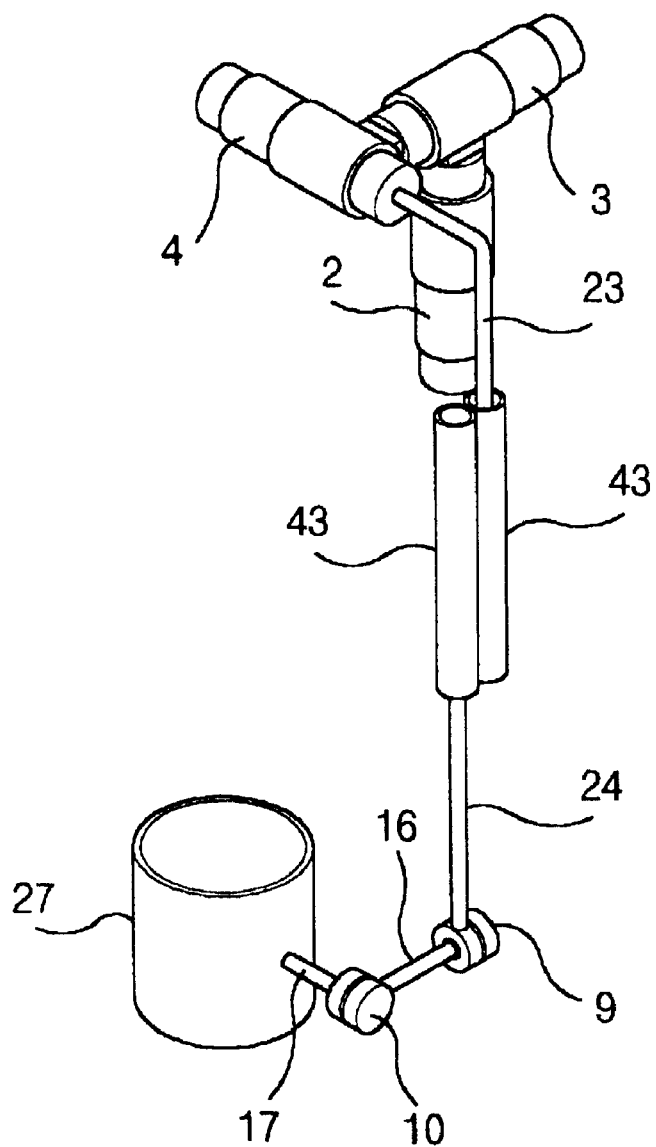
FIG. 8 shows configuration of a driven body in a cylinder type which moves linearly.

At this time, as shown in FIG. 8, the first connecting unit 25 includes trio parallel tubes 43 and the sixth and seventh connecting members 23, 24 are respectively connected to each one of the tubes 43 so to be replaced with a driven body moving linearly, vertically.

Figure 3:
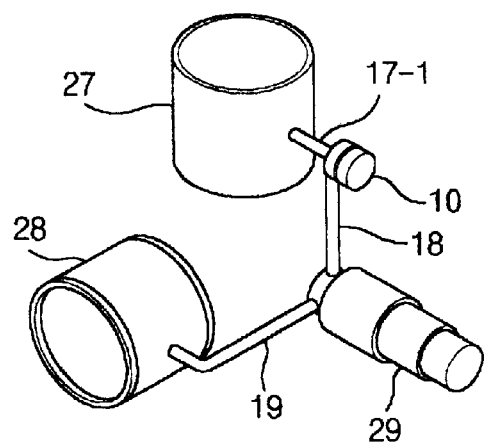
FIG. 3 is a perspective view showing configuration of an elbow portion of the master device having a force reflecting function mounted to a human arm according to the present invention.

In addition, as shown in FIG. 3, the second combining unit 27 connected to the first connecting unit 25 through the third rotating link member 10 and the connecting member 17-1 is combined upon an upper portion of elbow of the operator. Furthermore, one end of the second rotating shaft unit 29 is connected to the second combining unit 27 joining to connecting member 18 and the other end thereof is connected to the third combining unit 28 joining to other connecting member 19.

In addition, to the third combining unit 28, connected are the fourth. fifth and sixth cylindrical rotating shaft members 5, 6, 7 for associatively sensing motion of the arm according to motion of the wrist of the operator with use of angle of rotation.

Figure 4:
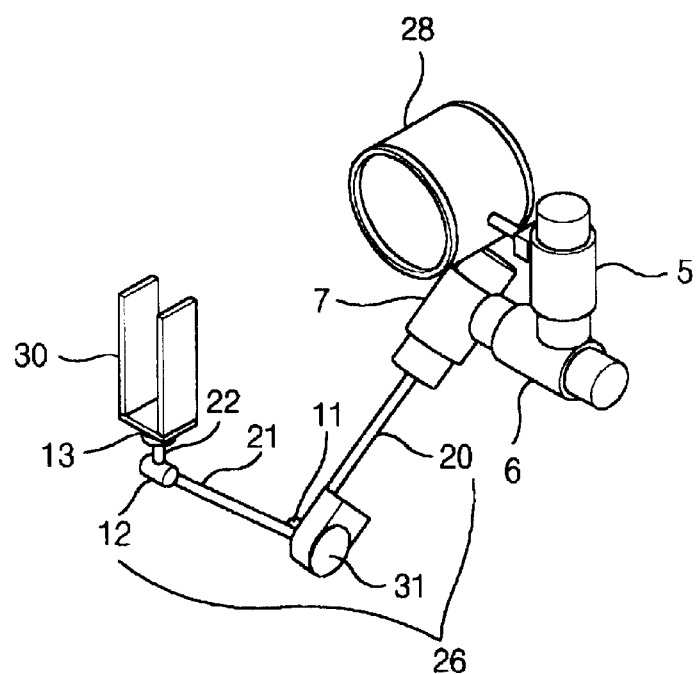
FIG. 4 is a perspective view showing configuration of a wrist portion of the master device having a force reflecting function mounted to a human arm according to the present invention.

In addition. as shown in FIG. 4, the fourth, fifth and sixth cylindrical rotating shaft members 5, 6, 7 are connected to the second connecting unit 26 which moves and rotates along with motion of the wrist of the operator. Furthermore, the second connecting unit 26 consists of the fourth rotating link member 11 for rotating along with motion of the wrist of the operator, the fourth connecting member 20, one end of which is connected to the sixth cylindrical rotating shaft member 7 and the other end of which is connected to the fourth rotating link member in order to rotate together with the fourth rotating link member 11, and the fifth connecting member 21 for connecting the fourth rotating link member 11 and the fifth rotating link member 12.

At this time, as shown in FIG. 8, the second connecting unit 26 includes two parallel tubes 43 and the sixth and seventh connecting members 23, 24 are respectively connected to each one of the tubes 43 so to be replaced with a driven body moving linearly, vertically.

In addition, the fourth combining unit 30 fixed to the back of the hand is connected to the second connecting unit 26 through the sixth rotating, link member 13 and the connecting member 22.

Also, as shown in FIG. 2 and FIG. 4, the initial Calibration position determining unit 31 is mounted on the first rotating link member 8 and the fourth rotating link member 11 in order to compensate position according to length of the arm and size of the hand of the operator.

On the while, after joining the first combining unit 1 of the master device for remote robot control on an upper portion of the back of the operator. the second combining unit 27 is joined to an upper portion of the elbow. After that, when the operator moves arm with the third combining unit 28 joined to a lower portion of the elbow, the first, second and third connecting members 14, 15, 16, the fourth and fifth connecting members 20, 21, and a plurality of connecting members 17-1, 17-2, 18, 19, 22 become moved along with that. Therefore. the first, second and third rotating link members 8, 9, 10 and the fourth, fifth and sixth rotating link members 11, 12, 13 become rotated.

In addition, when the first, second and third rotating link members 8, 9, 10 and the fourth, fifth and sixth rotating link members 11, 12, 13 rotates, the first, second and third connecting members 14, 15, 16 become rotated along with those members. At this time, the position determining units 35 of the third and sixth cylindrical rotating shaft members 4, 7 connected to the first and fourth connecting members 14, 20 become rotated.

According to that, all of, or else, only one or two of the first, second, fourth and fifth cylindrical rotating shaft members 2, 3, 5, 6, each of which is engaged with the third and sixth cylindrical rotating shaft members 4, 7, become rotated along with the third and sixth cylindrical rotating shaft members 4, 7 in accordance with motion of the arm of the operator.

At this time, the master device (not shown), receiving rotating angle data sensed by the position determining unit of each cylindrical rotating shaft member, determines moving direction of the operator arm by calculating three directional rotating motion of Roll, Pitch and Yaw, and then with results of the determination, remotely controls motion of the slave robot.

Figure 5:
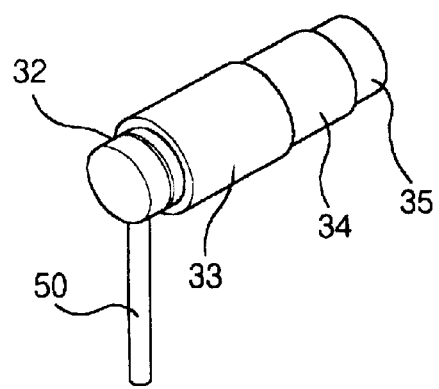
FIG. 5 is a perspective view showing configuration of each cylindrical rotating shaft member which is force reflecting mechanism according to the present invention.

On the other hand, as shown in FIG. 5, the first, second and third cylindrical rotating shaft members 2, 3, 4, the second rotating shaft member 29, and fourth, fifth and sixth cylindrical rotating link members 5, 6, 7 are provided with the position determining unit 35 connected to each connecting member subordinately rotating along with the first, second, third, fourth, fifth and sixth rotating link members 8, 9, 10, 11, 12, 13 in accordance with motion of the operator arm in order to sense rotating angle thereof, a torque generating unit 34 positioned to a rear end of the position determining unit 35 in which the torque generating unit 34 either executes no-load operation when there is no need of force reflection because the slave robot is smoothly adjusted or reflects force by actuating electrical brake or servo motor when motion of the slave robot is restricted by an obstacle, a gear unit 33 included in a rear end of the torque generating unit 34 for amplifying torque of the torque generating unit 34, and a direction determining unit 32 positioned in a rear end of the gear unit 33 for sensing moving direction of the arm.

Therefore, when power is applied to the torque generating unit 34 in proportion to force applied to the rear end of the slave robot, the torque generating unit 34 generates torque, and the torque is then amplified in the gear unit 33.

Figure 6:
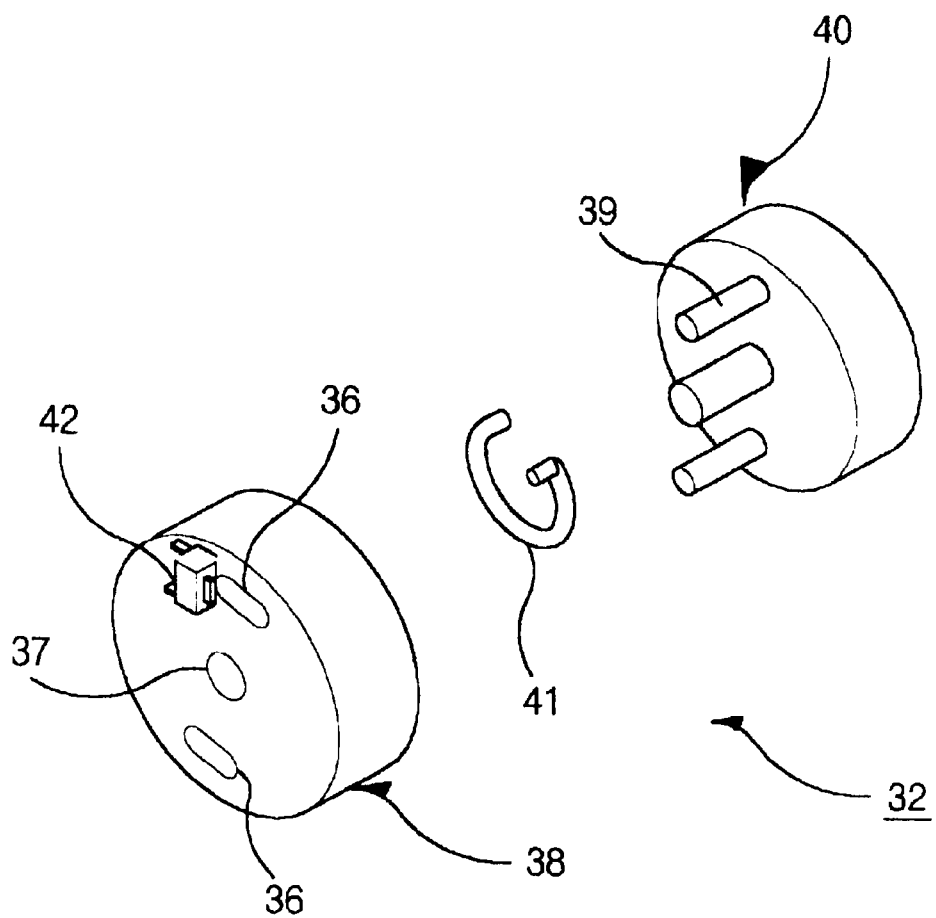
FIG. 6 is an exploded perspective view showing a direction determining unit according to the present invention.

In addition, as shown in FIG. 6, the direction determining unit 32 includes some members such as the connecting members. Furthermore, the direction determining unit 32 comprises a first circular disk 38 having elongated thorough holes 36 in upper and lower portions thereof and a thorough hole 37 in a center portion, a second circular disk 40 having a plurality of protrusions 39 interposed into each of the elongated thorough holes 36 and the thorough hole 37, a torsion spring 41 positioned between the first circular disk 38 and the second circular disk 40 for connecting the two disks with preload, and a limit switch 42 for sensing relative dimension of rotating load of each connecting member and the torsion spring 41.

Therefore, when the slave robot, remotely controlled in the present invention, cannot move in a direction with restricted by an obstacle, a controller of the master device senses moving direction of the operator arm. After the sensing, the controller continues to actuate brake if the operator moves to a direction of force reflection, or else cancels action of the brake when the limit switch 42 senses that the operator moves to an opposite direction such that the operator can use the arm.

In other words, FIG. 6 shows the direction determining unit 32 for determining rotating direction of the operator when the brake is used for an electrical driving device of the torque generating unit 34. If the brake is actuated by the force reflection function as described above, torque for interrupting rotation of the rotating shaft is generated according to dimensions of the applied current.

At this time, when the operator wants to move to the opposite direction, the action of the brake should be released. Therefore, a direction sensing unit should be required in order to detect motion of rotating to an opposite direction with the brake actuated.

For those reason, the second circular disk 40 is attached to the rotating shaft member connected to the brake, the rotating member is connected to the first circular disk 38, and the torsion spring 41 having a predetermined preload is positioned between the first circular disk 38 and the second circular disk 40 in order to connected the two disks.

Therefore, the first and second circular disks 38, 40 rotate together under a lower load than the preloaded torque of the torsion spring 41. At this time, if the brake is actuated, the second circular disk 40 is stopped and the first circular disk 38 becomes stopped, or else, rotated along the elongated thorough hole 36 so to actuate the limit switch 42 and be stopped in case of rotating to an opposite direction to the preload.

However, when the rotating load is exerted to an opposite direction to actuation of the brake, in case that the rotating load is greater than the preload, the first circular disk 38 rotates along the elongated thorough hole 36 so to actuate or deactivate the limit switch 42.

The limit switch 42 senses relative motion of the first and second circular disks 38, 40 as generated above. With use of such sensed signal, it is possible to judge whether the rotating load is greater than a certain criteria, which can be used as a signal for deactivating the break.

Figure 7A:
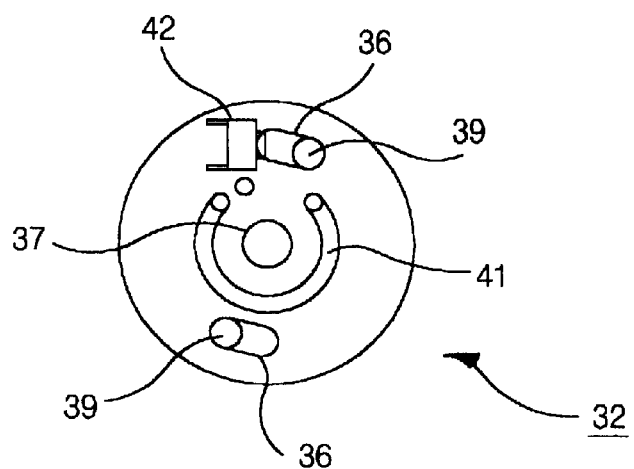
FIGS. 7a and 7b are references showing sensing states of a limit switch of the direction determining unit according to the present invention.
Figure 7B:
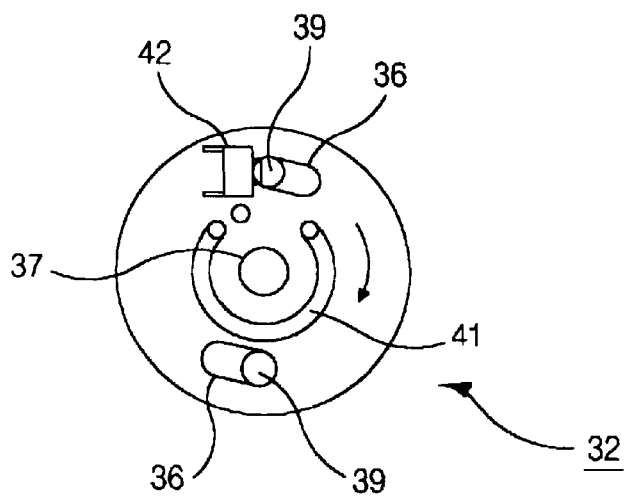

As a reference, FIG. 7a shows a state that the brake is not actuated and no load is applied. FIG. 7b shows another state that the brake is actuated, in which rotation is clockwise and the rotating load is greater than the preload torque of the torsion spring 41. At this time, after the brake rotates along the elongated thorough hole 36, the limit switch 42 is actuated.

Under the circumstance, the controller of the master device detects operation of the limit switch 42 and then determines direction to which the operator currently moves. In other words, when the operator moves to a direction (or, clockwise) or an opposite direction (or, counterclockwise) to which the brake is active, the second circular disk returns from FIG. 7b to FIG. 7a. According to that, the limit switch 42 is reverted such that the remote robot controller receives such actuating signal and then deactivates the brake.

Therefore, the operator can move to the opposite direction freely.

On the other hand, the master device is used as a teaching device by only using the position determining unit 35 without force reflecting function after eliminating the torque generating unit 34 having the electrical break motor or servo motor.

According to the above present invention, the master device for generating motion instruct of the slave robot by sensing motion of the arm with fixed to the arm of the operator, and reflecting motion limit information by external force and physical articulation limit sensed by the robot may be simplified in a serial chain configuration so to solve problems of human fatigue and operational complexity.

In addition, the present invention can minimize dead weight of units mounted to the arm by concentrating and positioning the cylindrical rotating shaft members 44, 45 near the body.

What is claimed is:

1. A master device having force reflecting function attached to a body of an operator for controlling robot remotely, comprising:
    first combining means fixed to an upper portion of a back of the operator;
    second and third combining means connected and fixed to upper and lower portions of an elbow of the operator;
    fourth combining means connected and fixed to a back of a hand of the operator;
    first rotating shaft means fixed to the first combining means, the first rotating shaft means having a plurality of cylindrical rotating shaft members;
    first connecting means of which one end is joined to the first rotating shaft means and the other end is serially connected through a plurality of rotating link members to a plurality of connecting members joined to the second combining means;
    third rotating shaft means having a plurality of cylindrical rotating shaft members joined to the second combining means through connecting members;
    second rotating shaft means having cylindrical rotating shaft members, the second rotating shaft means joined between the second combining means and the third combining means through connecting members; and
    second connecting means of which one end is joined to the fourth rotating shaft means and the other end is serially connected through a plurality of rotating link members to a plurality of connecting members joined to the third rotating shaft means,
    wherein the first rotating shaft means senses motion of a shoulder of the operator, the second rotating shaft means senses motion of the elbow of the operator, and the third rotating shaft means senses motion of a wrist of the operator.

2. A master device as claimed in claim 1, wherein each of the second, third and fourth combining means, the rotating link members, and the second connecting members connecting the third rotating shaft means has a predetermined length such that the rotating link members and the third rotating shaft means are positioned close to the body of the operator.

3. A master device as claimed in claim 1, wherein the first rotating shaft means includes first, second and third cylindrical rotating shaft members in three directions such that a position of an arm of the operator is determined according to motion of an articulation of the shoulder of the operator.

4. A master device as claimed in claim 1 or 2, wherein the third rotating shaft means includes fourth, fifth and sixth cylindrical rotating shaft members in three directions such that a position of a hand of the operator is determined by angle of rotation of the rotating shaft members according to motion of the wrist of the operator.

5. A master device as claimed in claim 1,
    wherein a plurality of the rotating link members for connecting the first connecting means are first, second and third rotating link members; and
    wherein the first connecting means further comprises:
        first connecting member of which one end is joined to the first rotating shaft means and the other end is joined to the first rotating link member;
        second connecting member for connecting the first rotating link member and the second rotating link member; and
        third connecting member joined to the second combining means through a connecting member for connecting the third rotating link member and the second rotating link member.

6. A master device as claimed in claim 1 or 5,
    wherein a plurality of the rotating link members for connecting the second connecting means are fourth, fifth and sixth rotating link members; and
    wherein the second connecting means comprises:
        fourth connecting member of which one end is joined to the third rotating shaft means and the other end is joined to the fourth rotating link member;
        fifth connecting member for connecting the fourth rotating link member and the fifth rotating link member; and
        sixth connecting member joined to a lower portion of the fourth combining means for connecting the sixth rotating link member and the fifth rotating link member.

7. A master device as claimed in claim 1, wherein a plurality of the rotating link members for connecting the first connecting means are first, second and third rotating link members;

wherein a plurality of the rotating link members for connecting the second connecting means are fourth, fifth and sixth rotating link members; and wherein the first rotating link member and the fourth rotating link member further comprise means for determining initial Calibration position determining unit in order to compensate position thereof according to an arm length and a hand size of the operator.

8. A master device as claimed in claim 1, each of the cylindrical rotating shaft members includes:

a direction determining unit connected to each connecting member for measuring a motional direction of the arm;

a gear unit for controlling torque;

a torque generating unit having an electrical brake motor or servo motor; and a position determining unit for measuring motion of the arm with use of angle of rotation.

9. A master device as claimed in claim 8, wherein the direction determining unit comprises:

a first circular disk having elongated thorough holes in upper and lower portions connected to a support core, and a thorough hole in a center portion;

a second circular disk having a plurality of protrusions interposed into the elongated thorough holes and the thorough hole;

a torsion spring positioned between the first circular disk and the second circular disk for connecting the two discs with preload; and a limit switch for sensing relative dimension of rotating load of each connecting member and the preload of the torsion spring.

10. A master device as claimed in claim 8, wherein the master device is used as a teaching device by only using the position determining unit without force reflecting function after eliminating the torque generating unit having the electrical break motor or servo motor.

11. A master device as claimed in claim 1, wherein the first and second connecting means include two parallel tubes, respectively; and wherein sixth and seventh connecting members are connected to each tube so to be moved linearly, vertically.

* * * * *

UNITED STATES PATENT AND TRADEMARK OFFICE
CERTIFICATE OF CORRECTION

PATENT NO.     : 6,301,526 B1
DATED          : October 9, 2001
INVENTOR(S)    : Kim et al.

It is certified that error appears in the above-identified patent and that said Letters Patent is hereby corrected as shown below:

<u>Title page,</u>
Item [73], please change the assignee name from "Institute of Science and Technology" to -- Korea Institute of Science and Technology --

Signed and Sealed this

Tenth Day of September, 2002

Attest:

Attesting Officer

JAMES E. ROGAN
*Director of the United States Patent and Trademark Office*